United States Patent
Luo

(10) Patent No.: US 10,228,015 B2
(45) Date of Patent: Mar. 12, 2019

(54) HYBRID DYNAMIC PRESSURE GAS RADIAL BEARING

(71) Applicant: Lifeng Luo, Shanghai (CN)

(72) Inventor: Lifeng Luo, Shanghai (CN)

( * ) Notice: Subject to any disclaimer, the term of this patent is extended or adjusted under 35 U.S.C. 154(b) by 0 days.

(21) Appl. No.: 15/575,617

(22) PCT Filed: May 19, 2015

(86) PCT No.: PCT/CN2015/079232
§ 371 (c)(1),
(2) Date: Nov. 20, 2017

(87) PCT Pub. No.: WO2016/183786
PCT Pub. Date: Nov. 24, 2016

(65) Prior Publication Data
US 2018/0156265 A1 Jun. 7, 2018

(51) Int. Cl.
*F16C 32/06* (2006.01)
*F16C 17/02* (2006.01)
*F16C 33/10* (2006.01)

(52) U.S. Cl.
CPC ............ *F16C 17/026* (2013.01); *F16C 17/02* (2013.01); *F16C 33/1015* (2013.01)

(58) Field of Classification Search
CPC ...... F16C 17/024; F16C 17/026; F16C 17/10; F16C 17/102; F16C 17/107; F16C 27/02; F16C 33/1015
See application file for complete search history.

(56) References Cited

U.S. PATENT DOCUMENTS 9,004,765 B1 * 4/2015 Lee .................. F16C 17/024
384/103
2015/0362012 A1 * 12/2015 Ermilov ............. F16C 17/024
384/105

FOREIGN PATENT DOCUMENTS

DE 102014201563 A1 * 7/2015 ............ F16C 17/024
JP 2005265010 A * 9/2005 ............ F16C 17/024

* cited by examiner

*Primary Examiner* — Phillip A Johnson
(74) *Attorney, Agent, or Firm* — Ware, Fressola, Maguire & Barber LLP

(57) ABSTRACT

A hybrid dynamic pressure gas radial bearing, which comprises a bearing outer sleeve, an inner sleeve and a foil type elastic part arranged between the bearing outer sleeve and the inner sleeve, the outer circumferential face and the left and right end faces of the bearing inner sleeve are respectively provided with regular groove-type patterns, and the groove-type patterns in one end face is in mirror symmetry with the groove-type pattern in the other end face, and the axial contour lines of the groove-type patterns in the outer circumference face and the radial contour lines of the groove-type patterns in the left and right end faces are in one-to-one correspondence and are connected with each other, has the rigidity characteristic of the high-limit rotating speed of the radial bearing of the groove-type dynamic pressure gas.

13 Claims, 6 Drawing Sheets

HYBRID DYNAMIC PRESSURE GAS RADIAL BEARING

TECHNICAL FIELD

The invention relates to a dynamic pressure gas radial bearing, in particular to a hybrid dynamic pressure gas radial bearing, which relates to a rigid characteristic of a high-limit rotating speed of a radial bearing of a groove-type dynamic pressure gas and the flexible characteristic of the high impact resistance and the load capacity of the foil type dynamic pressure gas radial bearing, belongs to the technical field of gas bearings.

BACKGROUND

The gas bearing has the advantages of being high in speed, high in precision, resistant to high temperature and small in friction loss, long in service life and the like. After the rapid development of recent decades, the gas bearing has been widely applied to the fields of high-speed supporting, high-precision supporting and the like. At present, various types of gas bearings have been developed, and the gas bearings are mainly divided into a dynamic pressure type and a static pressure type.

The dynamic pressure gas bearing takes gas as a lubricant, and a gas film is formed between the shaft and the bearing. It is a bearing form that the moving face is not in direct contact with the static face, and it has many advantages such as no pollution, low friction loss, wide temperature range, smooth operation, long use time and high working speed. Due to the small friction loss, and not necessary to use liquid lubricating oil, it is widely used in the field of high-speed rotary applications. In particular, it is often used in ultra-high-speed application field which is usually supported by a rolling bearing and where liquid lubricants are not suitable.

The dynamic pressure gas bearing in accordance with the direction of bearing load is divided into a dynamic pressure gas radial bearing, a dynamic pressure gas thrust bearing and a dynamic pressure radial thrust combined bearing. The dynamic pressure gas radial bearing is formed by the relatively moving two working faces forming a wedge-shaped space. When they are relatively moved, the gas is driven by its own viscous action and compressed into the wedge-shaped gap, thereby generating dynamic pressure to support the load. Different structural forms of gas dynamic pressure radial bearings due to structural differences, the work process is slightly different. At present, the more common types of dynamic pressure radial bearing structure are a tilting pad type, a groove type and a foil type.

The tilting pad type dynamic pressure gas radial bearing is a kind of excellent dynamic pressure gas bearing with self-adjusting performance, which can work safely in the space of smaller air gap, and is not sensitive to thermal deformation, elastic deformation and so on, and the machining precision is easy to be guaranteed, and it has the outstanding advantages of being capable of automatically tracking the change of the load. At present, it is mainly used in large-scale high-speed rotating machinery and turbine machinery at home and abroad. But its bearing structure is more complex, the installation process is complex, is higher than the general radial bearing requirements, thus its application is limited.

Although the foil type dynamic pressure radial bearing with elastic support, can make the bearing to obtain a certain bearing capacity and alleviate the impact vibration capacity, but the foil bearing is usually made of metal foil sheets, there are still some problems in the material manufacturing technology and processing technology, the damping value of the bearing can not be greatly improved, so that the rigidity of the bearing is not enough, the critical rotating speed of the bearing is low, and the bearing is easy to instability and even stuck during high-speed operation.

The groove type dynamic pressure gas radial bearing has good stability, and the certain stability is achieved even under no load; moreover, at a high speed, the static bearing capacity is larger than that of other forms of bearings. At present, it is mostly used for small-sized high-speed rotating machines, and used as a bearing in precision machinery, such as a gyroscope and a magnetic drum. However, due to the fact that the groove type dynamic pressure gas radial bearing is high in rigidity, so that the impact resistance is not good enough, the load capacity is not large enough, and high-speed operation under a large load cannot be realized.

How to realize the hybrid dynamic pressure gas radial bearing which has the rigid characteristics of high-limit rotating speed of the groove-type dynamic pressure gas radial bearing, and has the flexible characteristic of the high impact resistance and the load capacity of the foil type dynamic pressure gas radial bearing, is not only a target which is expected to be realized by researchers in the field, but also to achieve the application of dynamic pressure radial bearings in the larger load under the ultra-high-speed field has important value and far-reaching significance.

SUMMARY

In view of the problems and requirements of the prior art discussed above, it is an object of the present invention to provide hybrid dynamic pressure gas radial bearing which has the rigid characteristics of high-limit rotating speed of the groove-type dynamic pressure gas radial bearing, and has the flexible characteristic of the high impact resistance and the load capacity of the foil type dynamic pressure gas radial bearing, and to achieve the application of dynamic pressure gas radial bearings in the ultra-high-speed areas under larger load.

To achieve the above object, the subject matter of the present invention is as follow:

A hybrid dynamic pressure gas radial bearing, comprises a bearing outer sleeve, an inner sleeve and a foil type elastic part arranged between the bearing outer sleeve and the inner sleeve, the outer circumferential face and the left and right end faces of the bearing inner sleeve are respectively provided with regular groove-type patterns, and the groove-type pattern in one end face is in mirror symmetry with the groove-type pattern in the other end face, and the axial contour lines of the groove-type patterns in the outer circumference face and the radial contour lines of the groove-type patterns in the left and right end faces are in one-to-one correspondence and are connected with each other.

An implementation scheme, the axial high-position lines of the groove-type patterns in the outer circumferential face of the bearing inner sleeve corresponds to the radial high-position lines of the groove-type patterns in the left and right end faces, and are connected with each other in front of the circumferential chamfer in the end face; and the axial middle-position lines of the groove-type patterns in the outer circumferential face corresponds to the radial middle-position lines of the groove-type patterns in the left and right end faces, and are connected with each other in front of the circumferential chamfer in the end face; and the axial low-position lines of the groove-type patterns in the outer circumferential face corresponds to the radial low-position lines of the groove-type patterns in the left and right end faces, and are connected with each other in front of the circumferential chamfer in the end face.

An implementation scheme, the groove-type pattern is of an impeller shape.

As a preferable scheme, a wear-resistant coating is arranged on the matching face of the foil type elastic part matched with the outer circumferential face of the bearing inner sleeve.

As a preferable scheme, a fit clearance between the foil e elastic part and the bearing inner sleeve is 0.003-0.008 mm.

As a preferable scheme, both ends of the foil type elastic part are fixed on the inner circumferential wall of the bearing outer sleeve.

As a preferable scheme, the number of the foil type elastic parts is multiple, and the foil type elastic parts are uniformly distributed along the inner circumferential wall of the bearing outer sleeve.

As a more preferable scheme, clamping grooves used for fixing the foil type elastic part are formed in the inner circumferential wall of the bearing outer sleeve.

As a preferable scheme, the foil type elastic part is subjected to surface heat treatment.

An implementation scheme, the foil type elastic part is composed of a wave foil and a flat foil, the top end of the arc-shaped protrusion of the wave foil is attached to the flat foil, the transition bottom edge of the wave arch of the wave foil is attached to the inner circumferential wall of the bearing outer sleeve.

Another implementation scheme, the foil type elastic part is composed of a wave foil and a flat foil, the top end of the arc-shaped protrusion of the wave foil is attached to the inner circumferential wall of the bearing outer sleeve, and the transition bottom edge between the wave arches of the wave foil is attached to the flat foil.

As yet another embodiment, the foil type elastic part is composed of two flat foils, wherein a through hole is formed in the flat foil close to the inner circumferential wall of the bearing outer sleeve.

As a preferable scheme, stop rings are arranged at the two ends of a bearing outer sleeve.

As a preferable scheme, through holes and concave holes which are coaxial are formed in the outer circumference of the bearing outer sleeve, and the through holes are located in the concave holes in the same axis.

Compared to the prior art, the present invention offers the following benefits:

The foil type elastic part is arranged between the bearing outer sleeve and the bearing inner sleeve, and the outer circumferential face and the left and right end faces of the bearing inner sleeve are provided with regular groove-type patterns, and the axial contour lines of the groove-type patterns in the outer circumference face and the radial contour lines of the groove-type patterns in the left and right ends are in one-to-one correspondence and are connected with each other, and the groove-type pattern in one end face is in mirror symmetry with the groove-type pattern in the other end face, so that the hybrid dynamic pressure gas radial bearing is obtained, which has the rigidity characteristic of the high-limit rotating speed of the radial bearing of the groove-type dynamic pressure gas, and has the flexible characteristic of the high impact resistance and the load capacity of the foil type dynamic pressure gas radial bearing; compared with an existing simple groove-type dynamic pressure gas radial bearing, it has the anti-impact capacity and the load capacity which are increased in a multiplied mode at the same rotating speed; and compared with an existing pure foil type dynamic pressure gas radial bearing, it has a limit rotating speed which is increased by times under the same load; through the test, the hybrid dynamic pressure gas radial bearing provided by the invention can be realized a limit rotating speed of 160,000 rpm to 480,000 rpm under a load of 3-5 kg, but the existing dynamic pressure gas radial bearing can only achieve a load capacity of 1-3 kg, the maximum limit rotating speed can only reach 100,000 rpm to 180,000 rpm. It can be seen that the present invention can realize the application of dynamic pressure gas radial bearings in ultra high-speed areas under larger loads. Compared with the prior art, the present invention has made significant progress, and made the study of the dynamic bearing gas radial bearing technology take a new step.

Figure 1:
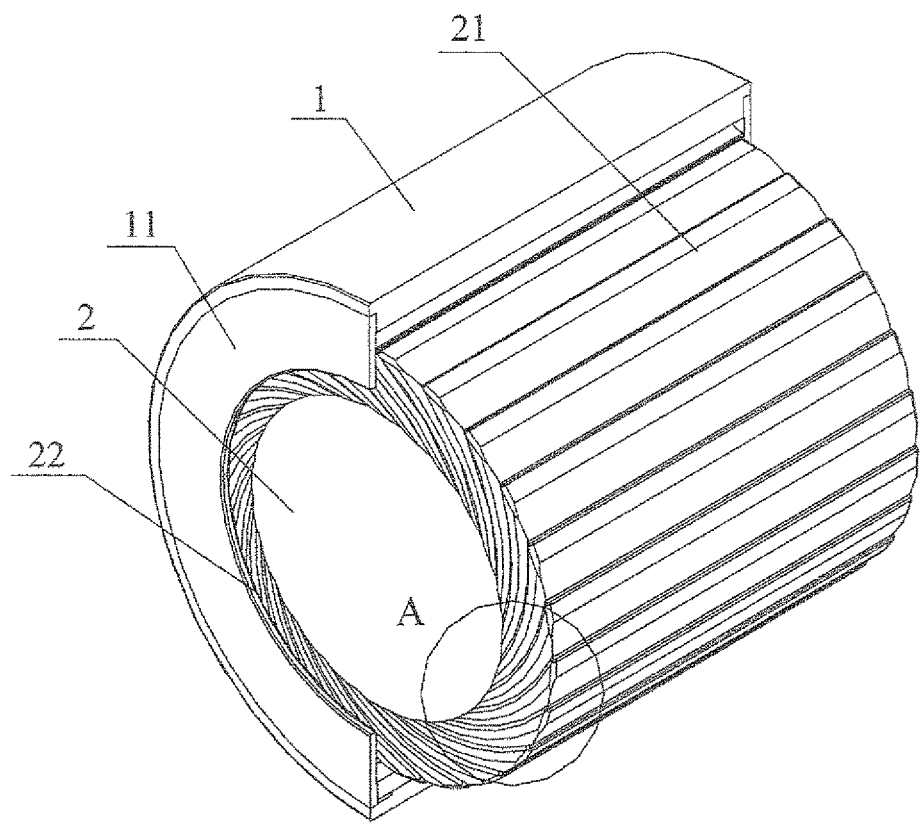
FIG. 1 is a schematic diagram of a left-view three-dimensional structure of partial segmentation of a hybrid dynamic pressure gas radial bearing according to the first embodiment of the present invention.
Figure 2:
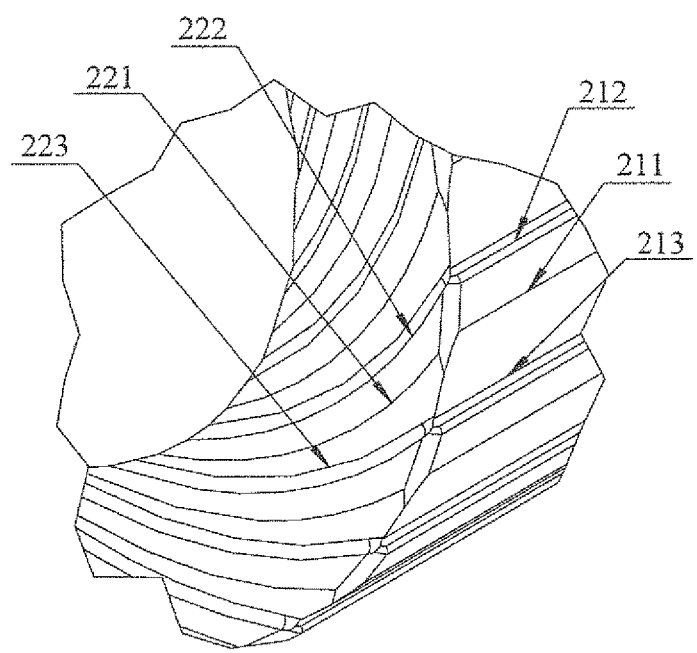
FIG. 2 is an enlarged view of the part A in FIG. 1.

Reference numerals in the figures denote as follows:

1, bearing outer sleeve; 11, stop ring; 12, clamping groove; 13, through hole; 14, concave hole; 2, bearing inner sleeve; 21, groove-type pattern in the outer circumferential face; 211, axial high-position line; 212, axial middle-position line; 213, axial low-position line; 22, groove-type patterns in the left end face; 221, radial high-position line; 222, radial middle-position line; 223, radial low-position line; 23, groove-type pattern in the right end face; 231, radial high-position line; 232, radial middle-position line; 233, radial low-position line; 3, foil type elastic part; 31, wave foil; 311, arc-shaped protrusions; 312, transition bottom edges between the wave arches; 32, flat foils; 33, the flat foil with through holes; 331, the through hole in the flat foil; 34, wear-resistant coating.

DETAILED DESCRIPTION

The subject matter of the present invention will be described in further detail below with reference to several embodiments and the accompanying drawings.

Example 1

Figure 3:
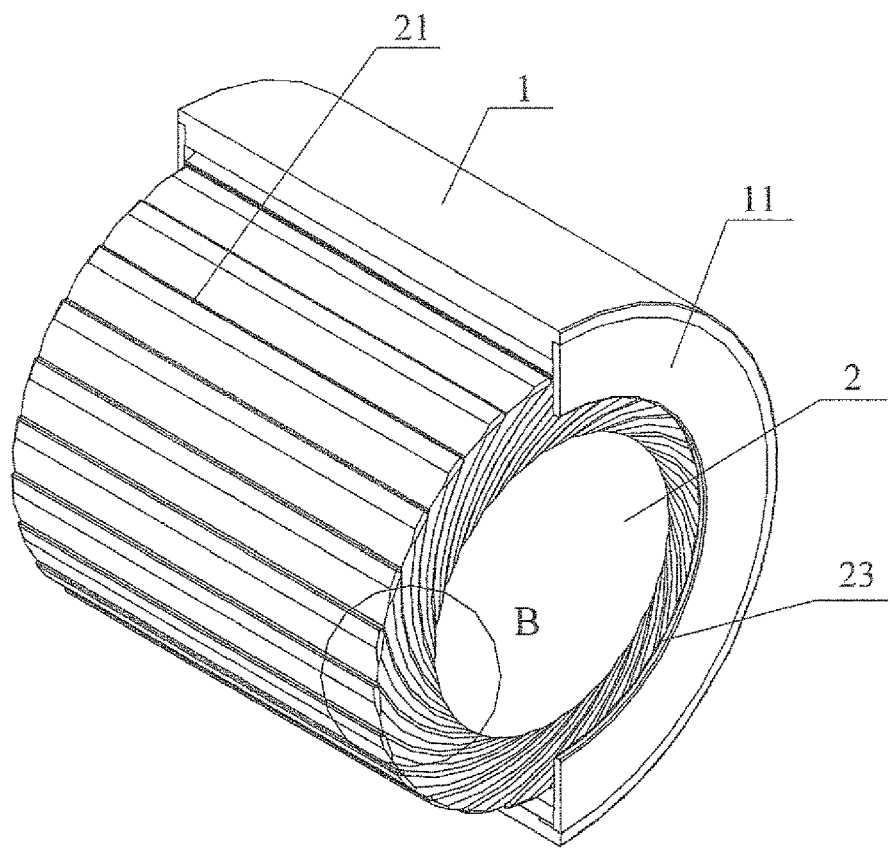
FIG. 3 is a schematic diagram of a right-view three-dimensional structure of partial segmentation of a hybrid dynamic pressure gas radial bearing according to the first embodiment of the present invention.
Figure 4:
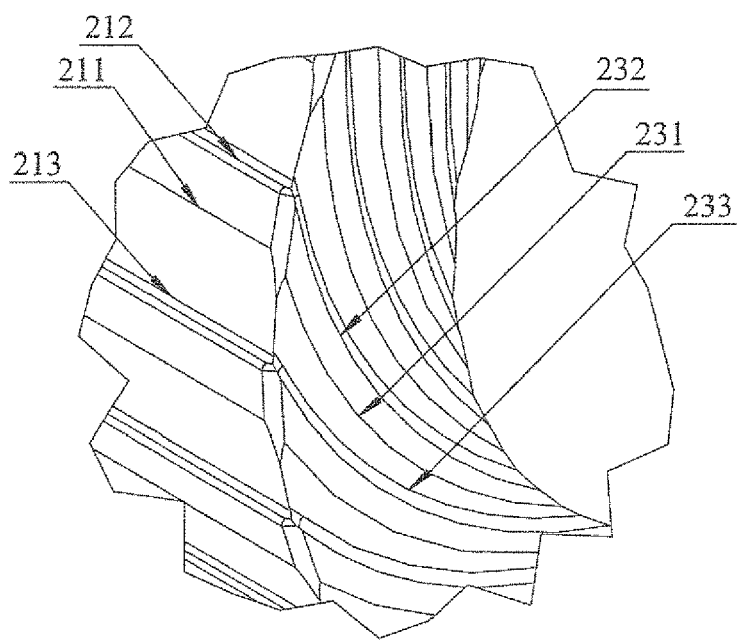
FIG. 4 is an enlarged view of the part B in FIG. 3.

As shown in FIG. 1 and FIG. 3, the hybrid dynamic pressure gas radial bearing provided by the embodiment of the invention, includes a bearing outer sleeve 1 and a bearing inner sleeve 2, wherein the outer circumferential face of the bearing inner sleeve 2 and the left end face and the right end face are respectively provided with regular groove-type patterns (21, 22 and 23 as shown in the figures, and the groove-type patterns in the embodiment are in the shape of an impeller), and a mirror symmetry is formed between the groove-type patterns 22 in the left end face and the groove-type patterns 23 in the right end face.

With combined reference to FIGS. 1 to 4, the axial contour lines of the groove-type patterns 21 in the outer circumferential face of the bearing inner sleeve 2 are connected with the radial contour lines of the groove-type patterns 22 in the left end face and the groove-type patterns 23 in the right end face, and correspond to each other, that is, the axial high-position lines 211 of the groove-type patterns 21 in the outer circumferential face are connected with the radial high-position lines (221 and 231) of the groove-type patterns 22 in the left end face and the groove-type patterns 23 in the right end face in front of the circumferential chamfer in the end face, and correspond to each other; the axial middle-position lines 212 of the groove-type patterns 21 in the outer circumferential face are connected with the radial middle-position lines (222 and 232) of the groove-type patterns 22 in the left end face and the groove-type patterns 23 in the right end face in front of the circumferential chamfer in the end face, and correspond to each other; the axial low-position lines 213 of the groove-type patterns 21 in the outer circumferential face are connected with the radial low-position lines (223 and 233) of the groove-type patterns 22 in the left end face and the groove-type patterns 23 in the right end face in front of the circumferential chamfer in the end face, and correspond to each other.

By forming a mirror symmetry between the groove-type patterns 22 in the left end face and the groove-type patterns 23 in the right end face, and forming one-to-one correspondence and being connected with each other between the axial contour lines of the groove-type patterns 21 in the outer circumferential face of the bearing inner sleeve 2 and the radial contour lines of the groove-type patterns 22 in the left end face and the groove-type patterns 23 in the right end face, so that the pressurized air generated by the groove-type patterns (22 and 23) resembling an impeller in the left and right end faces is continuously conveyed from a center of the shaft along the radial direction into groove-type-like channels formed by the groove-type patterns 21 in the outer circumferential face, and the required air film to provide a stronger support to the high-speed running bearing can be formed, and the air film serves as a lubricant for the dynamic pressure gas radial bearing, then the high-speed stable operation of the hybrid dynamic pressure gas radial bearing under the air floatation state can be ensured, and provides a further guarantee for achieving the high-limit rotating speed.

Figure 5:
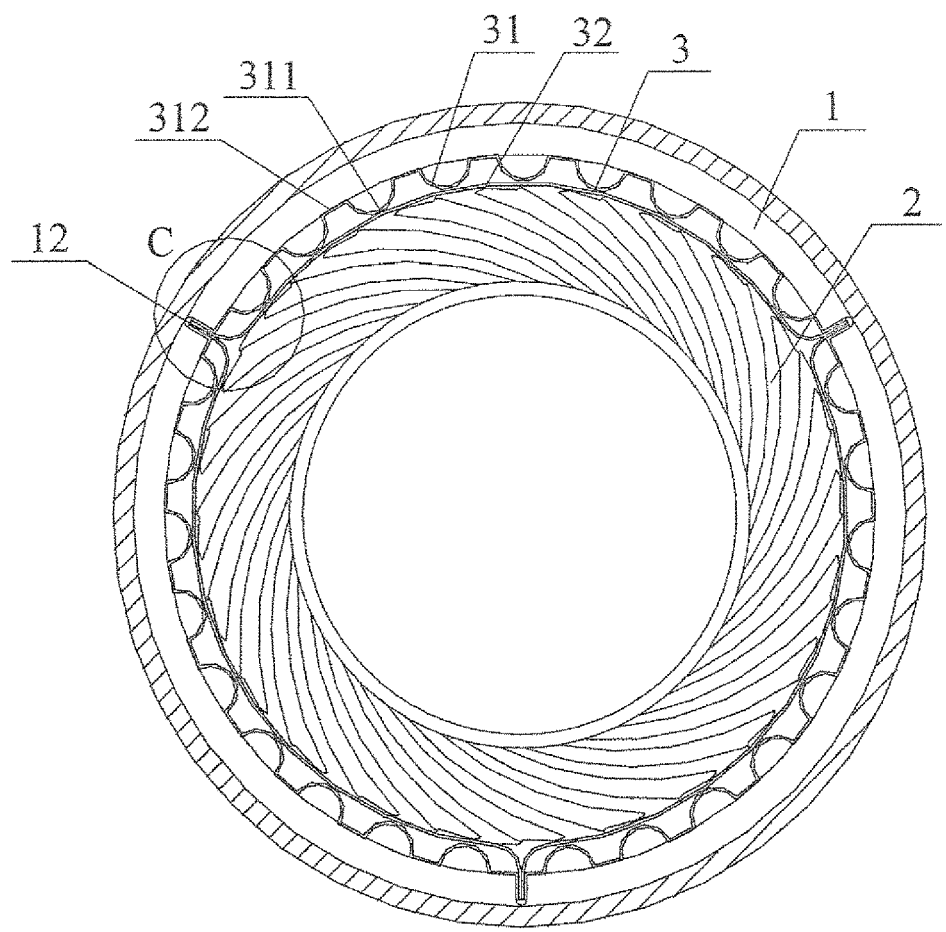
FIG. 5 is a schematic cross-sectional view of a hybrid dynamic pressure gas radial bearing according to embodiment 1 of the present invention.

As shown in FIG. 5, the hybrid dynamic pressure gas radial bearing provided by the embodiment further comprises the foil type elastic part 3 which is disposed between the bearing outer sleeve 1 and the bearing inner sleeve 2. Due to a wedge-shaped space is formed between the foil type elastic part 3 and the outer circumferential face of the bearing inner sleeve 2, when the bearing inner sleeve 2 rotates, the gas is driven and compressed into the wedge-shaped space due to the viscosity action of the gas, the radial dynamic pressure is obviously enhanced, so that the supporting force can be increased in a multiplied mode; meanwhile, due to the fact that the foil type elastic part 3 is additionally arranged, under the elastic action of the foil type elastic part 3, the load capacity of the bearing can be enhanced, and the impact resistance of the bearing and the capability of inhibiting the axial vortex are all improved remarkably. The number of the foil-type elastic members 3 may be plural (three as shown in FIG. 5), and the two ends of each foil type elastic piece 3 are fixed on the inner circumferential wall of the bearing outer sleeve 1.

Figure 6:
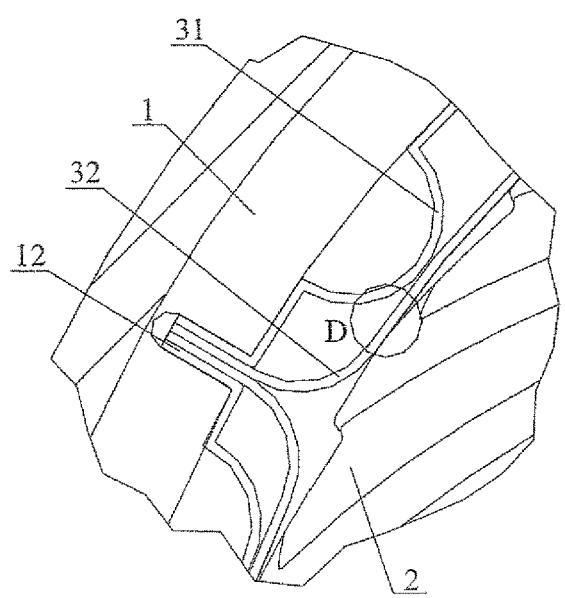
FIG. 6 is an enlarged view of the part C in FIG. 5.

As shown in FIG. 5 and FIG. 6, the foil type elastic part 3 can be composed of a wave foil 31 and a flat foil 32, the top end of the arc-shaped protrusion 311 of the wave foil 31 is attached to the flat foil 32, the wave arch transition bottom edge 312 of the wave foil 31 is attached to the inner circumferential wall of the bearing outer sleeve 1, and clamping grooves 12 for fixing the two ends of the foil type elastic part 3 are formed in the inner circumferential wall of the bearing outer sleeve 1, the number of the clamping grooves 12 corresponds to the number of the foil type elastic parts 3, are uniformly distributed along the inner circumferential wall of the bearing outer sleeve 1.

Figure 7:
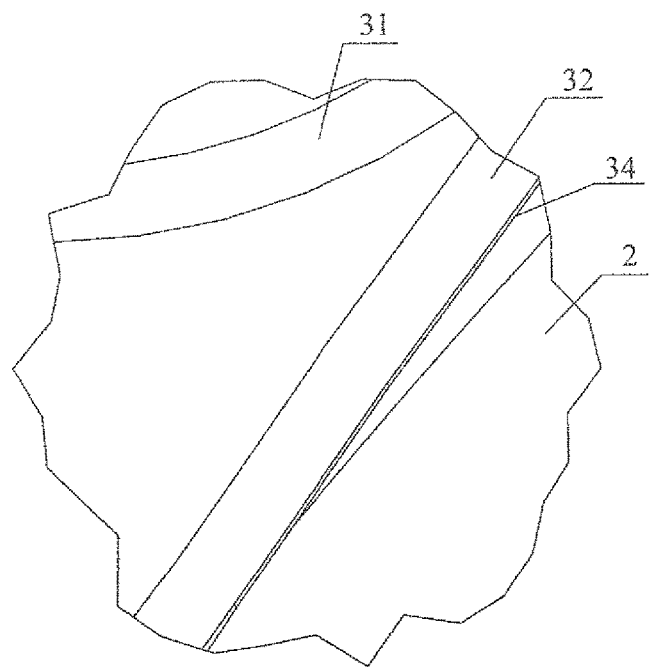
FIG. 7 is an enlarged view of the part D in FIG. 6.

As shown in FIG. 7, a wear-resistant coating is provided on a mating face of each foil type elastic part 3 that matched with the outer circumferential face of the bearing inner sleeve 2 (such as the inner face of the flat foil 32 to form the foil type elastic part 3), in order to further reduce the wear of the foil type elastic part 3 by the bearing inner sleeve 2 when the latter is rotating at a high speed, so as to prolong the service life of the bearing.

In addition, when the stop rings 11 are arranged at the two ends of the bearing outer sleeve 1 respectively, a self-sealing effect can be generated between the two end faces of the bearing inner sleeve 2 and the stop ring 11 driven by a high-speed rotating shaft, so that the dynamic pressure gas continuously generated by the groove type patterns can be completely and hermetically sealed in the whole matching clearance of the bearing, and the lubricating requirements of the high-speed running dynamic-pressure gas radial bearing can be fully guaranteed.

The foil type elastic part 3 is preferably subjected to surface heat treatment, so that the performance requirements of high-speed operation can be better met; and the matching clearance between the foil type elastic part 3 and the bearing inner sleeve 2 is preferably 0.003-0.008 mm, so that the reliability and the stability of high-speed operation of the bearing can be further ensured.

Example 2

Figure 8:
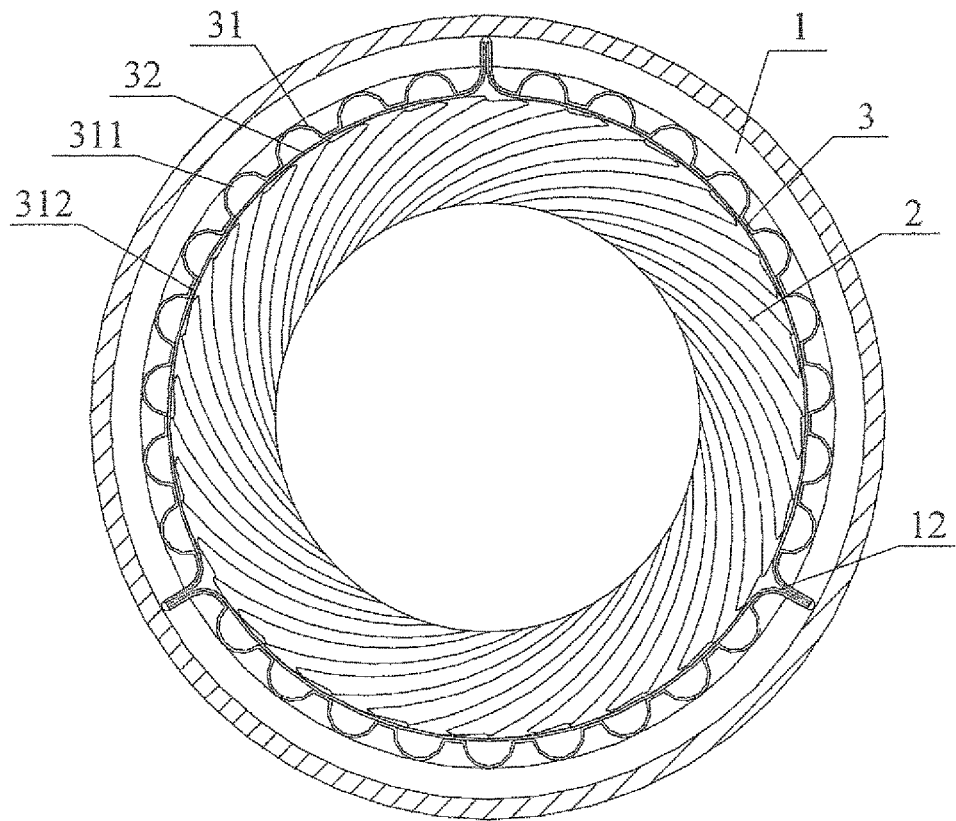
FIG. 8 is a schematic cross-sectional view of a hybrid dynamic pressure gas radial bearing according to embodiment 2 of the present invention.

As shown in FIG. 8, the only difference from the hybrid dynamic pressure gas radial bearing in the first embodiment is that the foil type elastic part 3 is composed of a wave foil 31 and a flat foil 32, the top end of the arc-shaped protrusion 311 of the wave foil 31 is attached to the inner circumferential wall of the bearing outer sleeve 1, and the wave-arch transition bottom edge 312 of the wave foil 31 is attached to the flat foil 32.

Figure 9:
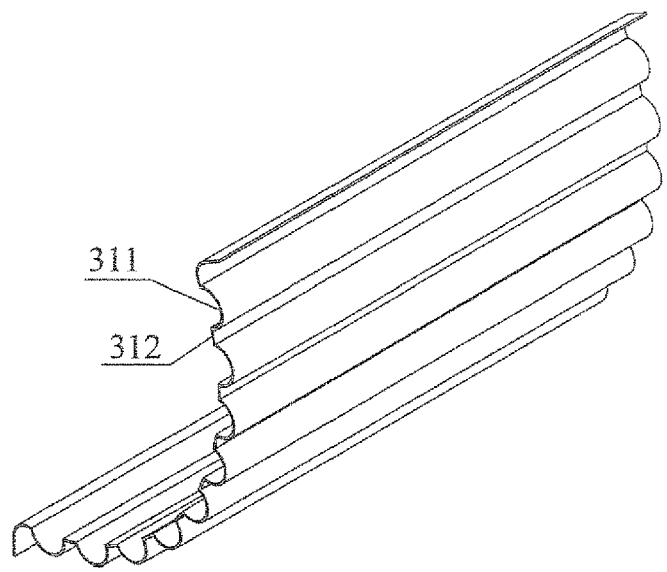
FIG. 9 is a schematic diagram of the wave foil in FIG. 8.

The structure of the wave foil 31 is shown in FIG. 9.

Example 3

Figure 10:
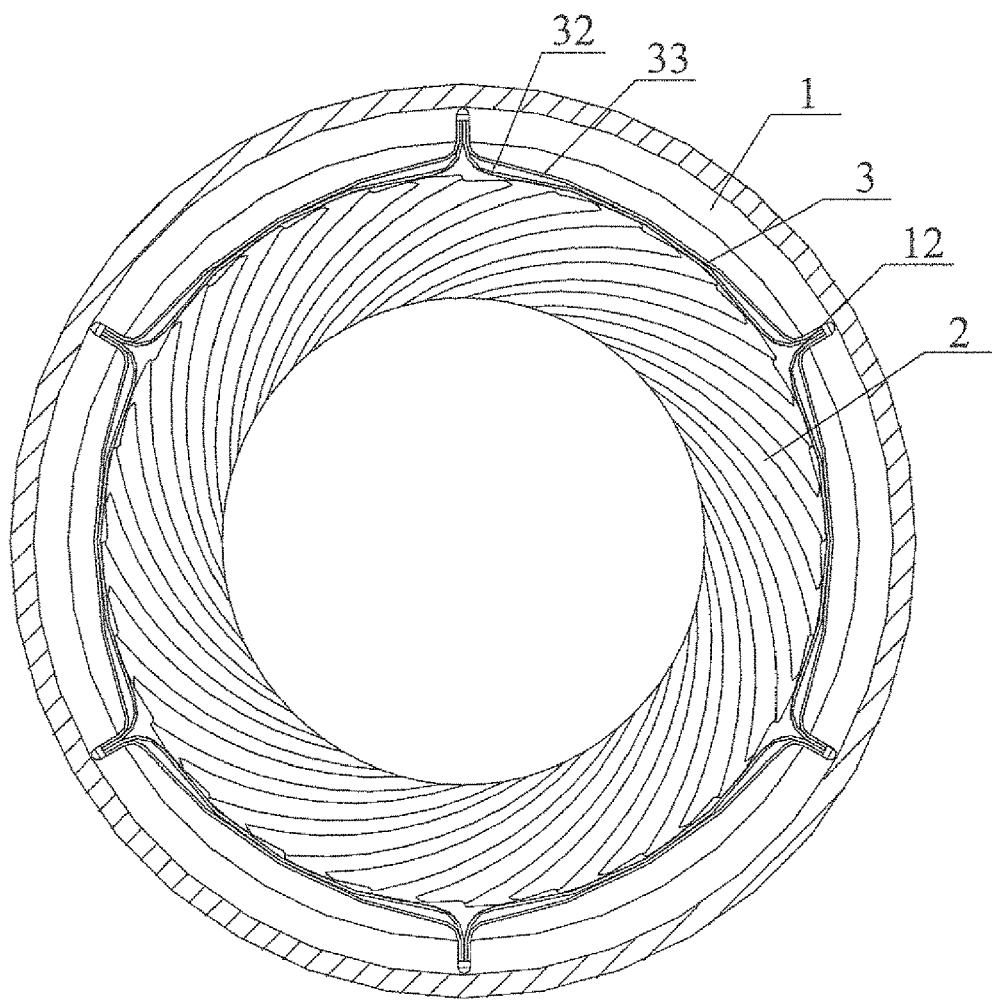
FIG. 10 is a schematic cross-sectional view of a hybrid dynamic pressure gas radial bearing according to embodiment 3 of the present invention.
Figure 11:
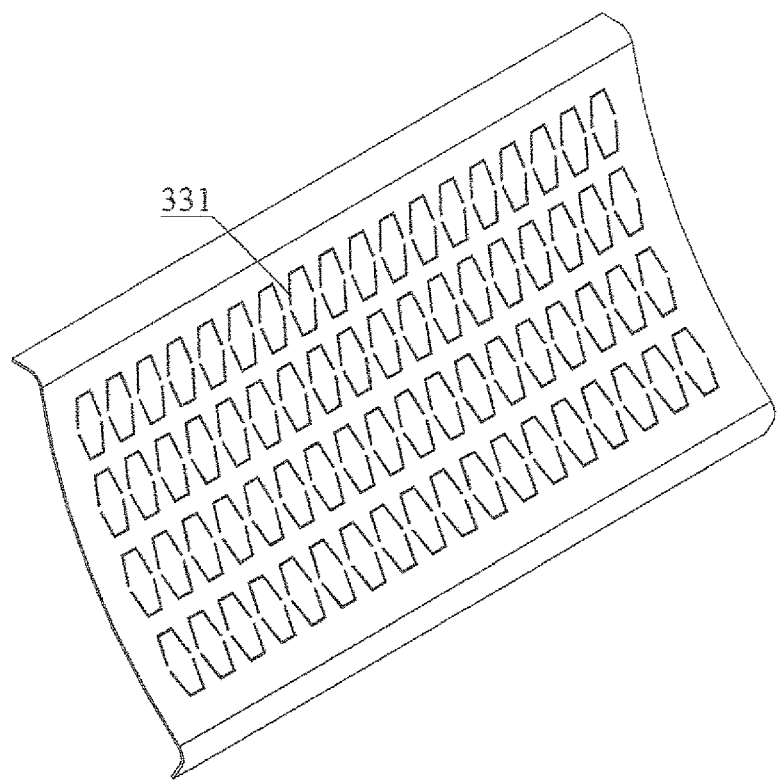
FIG. 11 is a schematic diagram of a flat foil with through holes in FIG. 10.

As shown in FIG. 10 and FIG. 11, the only difference from the hybrid dynamic pressure gas radial bearing in the first embodiment is that the foil type elastic part 3 is composed of a flat foil 32 and a flat foil 33 with through holes 331.

Example 4

Figure 12:
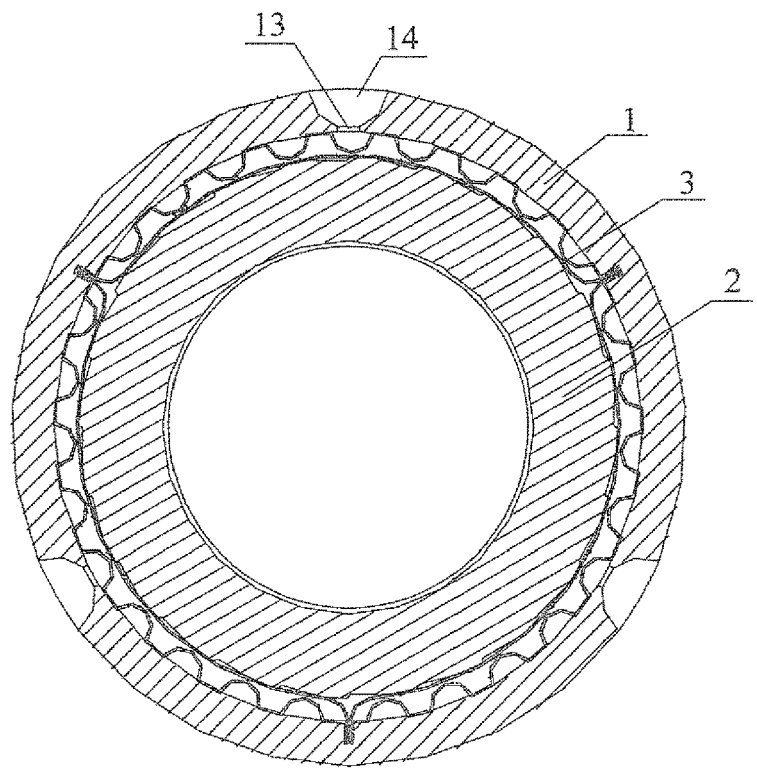
FIG. 12 is a schematic cross-sectional view of a hybrid dynamic pressure gas radial bearing according to embodiment 4 of the present invention.

As shown in FIG. 12, the only difference from the hybrid dynamic pressure gas radial bearing in the first embodiment is that coaxial through holes 13 and concave holes 14 are formed in the outer circumference of the bearing outer sleeve 1, and the through hole 13 is located in the concave hole 14. The through holes 13 and the concave holes 14 are used for conveniently monitoring the running state of the bearing on line (for example: a temperature sensor, a pressure sensor, a rotating speed sensor and the like).

In addition, the structure of the foil type elastic part 3 is not limited to that of the above embodiment, as long as the matching relation between the foil type elastic part 3 with the outer sleeve and the inner sleeve is ensured to meet the substantive requirements of the invention.

Test results show that the hybrid dynamic pressure gas radial bearing provided by the invention can be realized a limit rotating speed of 160,000 rpm to 480,000 rpm under a load of 3-5 kg, but the existing dynamic pressure gas radial bearing can only achieve a load capacity of 1-3 kg, the maximum limit rotating speed can only reach 100,000 rpm to 180,000 rpm. It can be seen that the present invention can realize the application of dynamic pressure gas radial bearings in ultra high-speed areas under larger loads. Compared with the prior art, the present invention has made significant progress, and made the study of the dynamic bearing gas radial bearing technology take a new step.

At last, it is noted here that the above disclosure is intended merely to describe the subject matter of the present invention in further detail and is not to be construed as limiting the scope of the invention. Non-substantive improvements and modifications made by those skilled in the art in accordance with the above disclosure all fall within the scope of the present invention.

What is claimed is:

1. A hybrid dynamic pressure gas radial bearing, comprising a bearing outer sleeve, a bearing inner sleeve and a foil type elastic part arranged between the bearing outer sleeve and the bearing inner sleeve, the bearing inner sleeve having an outer circumferential face and two opposing end faces, wherein the outer circumferential face and the end faces of the bearing inner sleeve are each provided with a groove-type pattern, the groove-type pattern on the outer circumference face having a plurality of axial contour lines, the groove-type pattern on each of the end faces having a plurality of radial contour lines, and wherein the groove-type pattern on one end face is in mirror symmetry with the groove-type pattern on the other end face, and the axial contour lines of the groove-type pattern on the outer circumference face and the radial contour lines of the groove-type pattern on each of the end faces are in one-to-one correspondence and are connected with each other.

2. The hybrid dynamic pressure gas radial bearing according to claim 1, wherein the groove-type pattern on the outer circumferential face comprises a plurality of axial high-position lines, a plurality of axial middle-position lines and a plurality of axial low-position lines, and the groove-type pattern on each of the end faces comprises a plurality of radial high-position lines, a plurality of radial middle-position lines, and a plurality of radial low-position lines, and wherein the axial high-position lines of the groove-type pattern on the outer circumferential face of the bearing inner sleeve correspond to the radial high-position lines of the groove-type pattern on each of the end faces, and are connected with each other at a circumferential chamfer on each of the end faces;

the axial middle-position lines of the groove-type pattern on the outer circumferential face correspond to the radial middle-position lines of the groove-type pattern on each of the end faces, and are connected with each other at a circumferential chamfer on each of the end faces; and the axial low-position lines of the groove-type pattern on the outer circumferential face correspond to the radial low-position lines of the groove-type pattern on each of the end faces, and are connected with each other at a circumferential chamfer on each of the end faces.

3. The hybrid dynamic pressure gas radial bearing according to claim 1, a wear-resistant coating is arranged on a mating face of the foil type elastic part matched with the outer circumferential face of the bearing inner sleeve.

4. The hybrid dynamic pressure gas radial bearing according to claim 1, wherein a fit clearance between the foil type elastic part and the bearing inner sleeve is 0.003-0.008 mm.

5. The hybrid dynamic pressure gas radial bearing according to claim 1, wherein two ends of the foil type elastic part are both fixed on an inner circumferential wall of the bearing outer sleeve.

6. The hybrid dynamic pressure gas radial bearing according to claim 1, wherein the foil type elastic part comprises multiple parts uniformly distributed along an inner circumferential wall of the bearing outer sleeve.

7. The hybrid dynamic pressure gas radial bearing according to claim 1, wherein at least one clamping groove formed in an inner circumferential wall of the bearing outer sleeve is used to fix the foil type elastic part to the inner circumferential wall.

8. The hybrid dynamic pressure gas radial bearing according to claim 1, wherein the foil type elastic part is subjected to surface heat treatment.

9. The hybrid dynamic pressure gas radial bearing according to claim 1, wherein the foil type elastic part is composed of a wave foil and a flat foil, the wave foil comprising an arc-shaped protrusion having an top end and a transition bottom edge, and wherein the top end of the arc-shaped protrusion of the wave foil is attached to the flat foil, and the transition bottom edge of the wave arch of the wave foil is attached to an inner circumferential wall of the bearing outer sleeve.

10. The hybrid dynamic pressure gas radial bearing according to claim 1, wherein the foil type elastic part is composed of a wave foil and a flat foil, the wave foil comprising a plurality of arc-protrusions and a plurality of wave arch transition bottom edges between the arc-protrusions, each arc-protrusion having a top end, wherein the top end of each arc-shaped protrusion of the wave foil is attached to an inner circumferential wall of the bearing outer sleeve, and each wave arch transition bottom edge of the wave foil is attached to the flat foil.

11. The hybrid dynamic pressure gas radial bearing according to claim 1, wherein the bearing outer sleeve has an inner circumferential wall, and wherein the foil type elastic part is composed of two flat foils, and the flat foil closer to the inner circumferential wall of the bearing outer sleeve has through holes formed therein.

12. The hybrid dynamic pressure gas radial bearing according to claim 1, wherein the bearing outer sleeve comprises a plurality of stop rings arranged at two ends of the bearing outer sleeve.

13. The hybrid dynamic pressure gas radial bearing according to claim 12, wherein the bearing outer sleeve further comprises an outer circumference having through holes and concave holes coaxially formed thereon, and wherein the through holes are located in the concave holes on a same axis.

\* \* \* \* \*